July 2, 1940. J. V. TRACY 2,206,437
INSTRUMENT CAP
Filed Feb. 2, 1939 2 Sheets-Sheet 1

Inventor
Joseph V. Tracy
by Roberts Cushman & Woodberry
attys.

July 2, 1940.   J. V. TRACY   2,206,437
INSTRUMENT CAP
Filed Feb. 2, 1939   2 Sheets-Sheet 2

Inventor
Joseph V. Tracy
by Roberts Cushman & Woodberry
att'ys.

Patented July 2, 1940

2,206,437

UNITED STATES PATENT OFFICE 2,206,437

INSTRUMENT CAP

Joseph V. Tracy, Fairfield, Conn., assignor to Manning, Maxwell & Moore, Incorporated, New York, N. Y., a corporation of New Jersey Application February 2, 1939, Serial No. 254,320

6 Claims. (Cl. 73—151)

This invention pertains to pressure gauges or other instruments wherein a movable index, pointer or hand cooperates with a graduated dial or the like, the dial, the indicator and the means for actuating the latter being housed within a case having an opening at its front to permit installation of said parts but which has a removable closure cap for protecting the mechanism, said cap including a transparent panel, usually of glass, through which the position of the index may be observed. The invention relates more particularly to an improved closure cap for such instruments.

Customarily the closure cap comprises a metal ring having an inner face constituting an abutment for the marginal portion of a glass disk. Usually a resilient washer of cork, rubber or soft copper is interposed between the ring and the glass to lessen the danger of breakage of the glass and also to provide a good seal between the glass and the ring. A removable locking annulus of metal bears against the inner surface of the glass to hold the latter in place. The ring has an integral cylindrical flange portion which overlaps the front of the case, usually embracing the front end of the case, said flange having provision, for instance internal screw threads or bayonet joint elements, engageable with complemental parts of the case, thereby removably to hold the cap in place.

Such usual caps as just described thus comprise several independent parts, ordinarily three or four at least; the transparent panel is ordinarily of flat (usually quite thin) glass and subject to breakage from accidental blows or undue vibration; and since the ring which forms the abutment for the glass panel must be of substantial radial width, it extends inwardly over the marginal portion of the case and conceals the outer part of the dial so that the circle upon which the graduations are located is necessarily of substantially less diameter than the internal diameter of the case. The graduations must thus be spaced closer than though the full diameter of the dial were available, and ease of reading is thus reduced.

Principal objects of the invention are to provide a cap for gauges or other instruments of similar type, so devised as to permit use, if desired, of dial graduations formed on a circle substantially equal to the diameter of the gauge case and which are readily visible at an angle of view at which it would not be possible to read the usual gauge; to provide a cap having a transparent panel which is not easily shattered or cracked by blows or vibrations and which provides more or less magnification of the graduations of the dial; to provide a cap of unitary construction wherein the transparent panel and the parts whereby it is removably held to the case are of the same material and integral with each other, and to provide a cap which may be made cheaply and easily and which, while possessing the above advantages, may, as a practical matter, be substituted for the usual cap in usual commercial gauges.

Glass is probably the only commercially available material which is transparent and also quite resistant to abrasion. However, it has been observed that, under most conditions of use pressure gauges or like instruments are not exposed to abrasive factors so that it is not of particular importance that the transparent panel of the gauge cap be of a material which has so great resistance to abrasion as glass.

In accordance with the present invention the cap is made (for example by a moulding operation) as a single integral unit from a hard and transparent material which constitutes all of the essential parts of the cap, including the cylindrical attaching flange and the transparent panel. By following the procedure herein described, the usual ring which forms the abutment for the glass panel, the glass-cushioning washer and the retaining annulus become unnecessary, since the margin of the transparent panel is integral and directly joined with the cylindrical attaching flange which carries the means for uniting the cap to the case. Since the attaching flange has an inner diameter at least as great as the outside diameter of the case, the transparent panel also may be of a diameter at least equal to the outer diameter of the case, and the entire area of the dial, (whether the latter fits snugly within the case or whether the edge of the dial rest against the forward edge of the case) is exposed to view through the panel. Preferably the panel is concavo-convex with its convex surface at the outside, thus providing added space in front of the dial for the index. However, if desired, the panel may be plano-convex, thus providing a magnifying effect. In any event the rounded margin of the panel near its junction with the cylindrical attaching flange, gives some degree of magnification and greatly facilitates the clear reading of the dial indications when viewed from the extreme left or right.

While the invention may be embodied in a cap of various materials, including moulded or pressed glass (preferably of a strong and heatresistant variety) certain transparent cellulose derivatives, for instance the acetate, which may be useful under special conditions, it has been found that some of the synthetic resins, for instance resins derived from urea formaldehyde, casein-formaldehyde, glycerol or vinyl, in particular polymers of methacrylic acid, are of especial value, since they are mouldable and after moulding are tough, transparent, have a reasonably hard surface, are not injuriously affected by moisture, saturated steam, oil, or exposure to ordinary temperatures, and can readily be machined.

In the accompanying drawings wherein certain desirable embodiments of the invention are illustrated by way of example:

Figure 1:
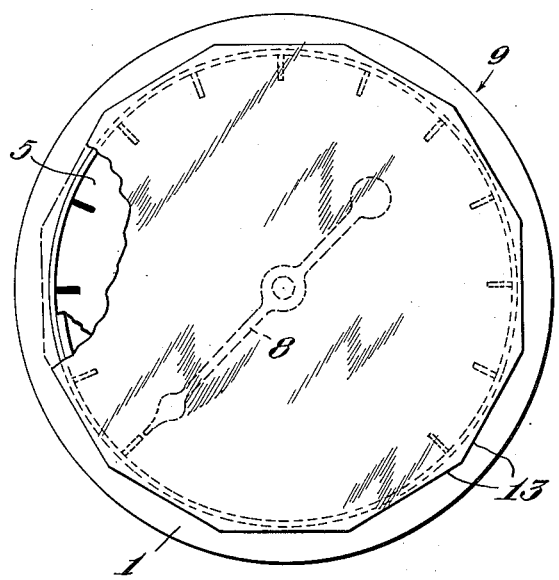
Fig. 1 is a front elevation, partly broken away, showing one desirable form of cap applied to a gauge case.

Referring to the drawings, the numeral 1 indicates the case of a pressure gauge or other instrument of the class to which the present invention appertains. As indicated more particularly in Fig. 2, this case is of a conventional type employed in instruments of this kind and comprises a back 2 and the cylindrical side wall 3 (Fig. 6), the latter being of such depth as to accommodate the gauge movement or other actuating elements of the instrument. While the case is here shown as open at its forward end to facilitate the introduction of the gauge mechanism, it is to be understood that, so far as the present invention is concerned in its broader aspects, the case may be of other type, for instance one in which the only opening at the front is that through which the index staff projects. Ordinarily the side wall 3 is a cylindrical shell, although for certain types of instrument it may be of other than cylindrical contour; and when reference herein is made to the diameter of the case, it is to be understood that the term "diameter" does not necessarily imply a case of exactly circular contour but that this term is merely to be considered as referring to the transverse dimension of the case regardless of its shape. As here illustrated, the forward portion of the outer surface of the side wall 3 is screw threaded as usual at 4 (Fig. 6) for engagement with internal screw threads upon the cap, hereinafter more specifically described. While screw threads are here illustrated as the means for uniting the cap and case, it is to be understood that any other customary and/or desirable connecting means may be employed, for instance, a bayonet joint.

Figure 5:
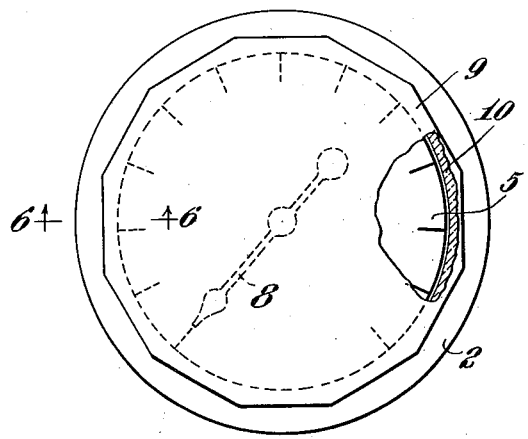
Fig. 5 is a fragmentary view to smaller scale, partly broken away, showing a gauge case and a dial such as may be used with the improved cap of the present invention.
Figure 7:
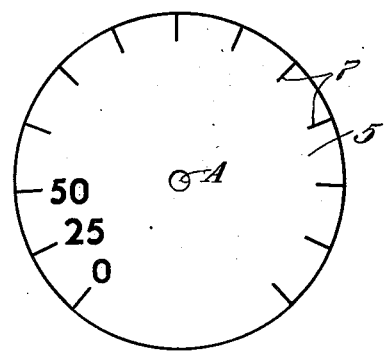
Fig. 7 is a front elevation of the dial of Fig. 5.
Figure 6:
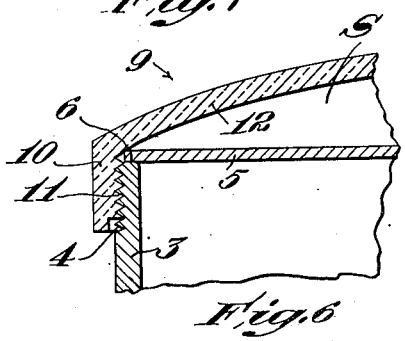
Fig. 6 is a fragmentary section, to larger scale, on the line 6—6 of Fig. 5, showing the cap and dial in place.

As illustrated in Figs. 5, 6 and 7, the instrument comprises a dial 5 disposed approximately in the plane of the front or open end of the case, and as illustrated by way of example is of a diameter substantially equaling the external diameter of the wall 3 of the case, so that its margin may engage the forward end of the wall 3. However, it is obvious that other usual means for supporting and positioning the dial may be employed and that, as above suggested, the dial may be of a diameter such as to permit it to be fitted within the case. For instance, in the last suggested arrangement it has been found that a 4½ inch dial may be disposed in a plane approximately ⅜ inch behind the plane of the forward edge of the case without undue impairment of the visibility of the dial through the front panel of the cap. In accordance with the present arrangement and as here illustrated the dial 5 may be furnished with graduations located at its extreme marginal portion. Such graduations may be provided with any suitable designating characters, for example numerals. The dial is provided with a central aperture A for the passage of the usual index staff, upon the forward end of which is mounted the index needle or pointer 8 (Fig. 1).

In accordance with the present invention the removable cap 9, which overlies and protects the dial 5 and the index 8, is preferably of unitary construction, consisting of a single integral mass of material. Preferably the material selected for making this cap should be one which may be conformed at least roughly to shape by a moulding or equivalent operation in order to save expense in manufacturing. However, this is not absolutely essential since it is conceivable that the cap may be made by machining it from a solid block of the selected substance.

While as already suggested other materials, for instance glass, in particular the recently developed glasses designed to withstand violent temperature changes and heavy shocks, are useful for the purpose, one of the substances which appears most desirable so far as is now known to the applicant, is a transparent mouldable polymer of methacrylic acid. This material posesses in high degree the characteristics which are desirable in a gauge cap made in accordance with the present invention; to wit, it is substantially colorless and transparent, it may be formed to shape by moulding or a similar operation; it is very light in weight as compared with glass; it is tough and does not shatter easily when subjected to hard blows or extreme vibration; it has a hard surface which is not too easily abraded, roughened or scratched for the purpose in view; and such scratches as may occur may readily be polished out; it is easily machined; it is not injured by oil, moisture or saturated steam nor vapors of most chemicals; and will withstand a substantial degree of temperature without being deformed or deteriorating.

Figure 2:
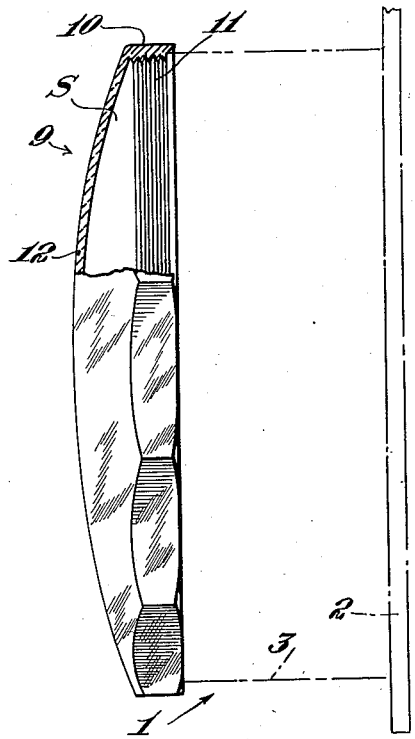
Fig. 2 is an edge view, partly in diametrical section, of the cap shown in Fig. 1, the gauge case being indicated in broken lines.

As here illustrated, this one-piece cap comprises a cylindrical flange portion 10 which is internally screw threaded at 11 for engagement with the external screw threads 4 upon the gauge case, it being understood, as above suggested, that this flange 10 may be furnished with other means than screw threads for engagement with complemental elements of the gauge case, thereby to permit removable attachment of the cap to the casing. The flange 10 is integrally joined to the margin of a transparent panel portion 12 which, as illustrated in Figs. 2 and 6, is of concavo-convex contour in diametrical section, with the convex side directed forwardly, that is to say, at the outer side of the cap. The curved contour greatly increases the strength and resistance to deformation or breakage, as compared with a flat disk. The inner surface of the panel 12 is of a diameter at least as great as the inner diameter of the case and, as illustrated in Fig. 6, is of a diameter substantially equaling the outer diameter of the case, with the extreme margin of said inner surface of the panel disposed substantially in the plane of the front edge of the case. Thus the extreme edge of the dial is readily visible through the cap, even though the dial be of a diameter such as to rest against the forward edge of the case. By making the cap of concavo-convex form, a substantial space S is provided between the dial and the inner surface of the cap for the accommodation of the index 8, and when the cap is screwed down tightly, the edge of the dial is thereby clamped firmly against the case.

It will be manifest that with the above arrangement and by employing a cap of transparent material and of unitary construction there is no possibility of leakage of vaporous or gassy substances between the transparent panel and the flange 10, and that the entire area of the dial is exposed to view, although fully protected from atmospheric effects. It is thus possible to place the graduations at the extreme outer margins of the dial and thus, with a dial or gauge case of a given size, to provide wider-spaced graduations than has usually been possible, thus greatly facilitating the reading of the gauge from a distance.

Figure 8:
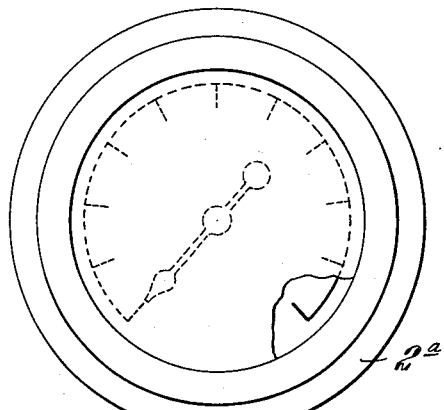
Figs. 8, 9 and 10 are views corresponding to Figs. 5, 6 and 7, respectively, illustrating a gauge case of the same diameter as that of Fig. 5, but showing the usual gauge and dial to make clear the increase in dial diameter made possible by the use of the improved cap as compared with the old practice.
Figure 10:
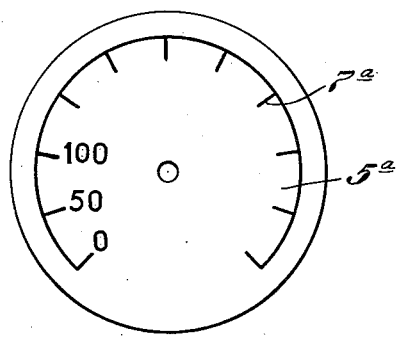
Figure 9:
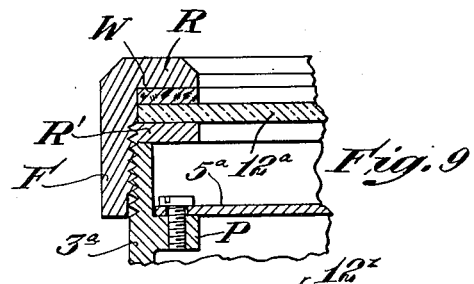

For purposes of comparison, Figs. 8, 9 and 10 indicate generally the construction of usual prior gauge caps. In these figures the gauge case is of the same diameter as that shown in Figs. 5, 6 and 7, this case comprising the back 2ª and the cylindrical side wall 3ª. The dial 5ª is disposed within the side wall 3ª, resting upon lugs P. The cap 9ª comprises the flat ring R having the internally screw-threaded flange F which engages screw threads on the outer side of the wall 3ª. Against the inner surface of the ring R is disposed a resilient washer W which forms an abutment for the flat glass panel 12ª which is kept in place by the locking annulus R' which has threaded engagement with the screw threads of the flange F.

Since the ring R is of substantial radial width in order to provide the requisite stiffness and rigidity and to form the proper abutment for the glass panel, it necessarily overlies a substantial marginal area portion of the dial 5ª and thus it becomes necessary to locate the graduations 7ª upon a circle substantially less in diameter than the diameter of the dial as a whole. The graduations must thus be placed more closely together than on the dial 5 of Fig. 7, making it less easy to read the gauge from a distance. The cap of Fig. 9 consists of four independent elements which must be independently shaped and then assembled; such operations are expensive and time-consuming; the complete cap is heavy and cumbersome, and the panel 12ª is of a character such that it is easily broken by accidental blows or undue vibration during transit or in use. As compared with this old construction, the one-piece cap 9 herein disclosed is cheap and easy to make; it is light in weight; it exposes the entire dial to view; it is not easily broken either during transit or use; and it provides all the requisite protection for the gauge movement, dial and index hand, and at the same time, being of unitary construction, has no crevices through which gaseous or vaporous materials may leak.

Figure 3:
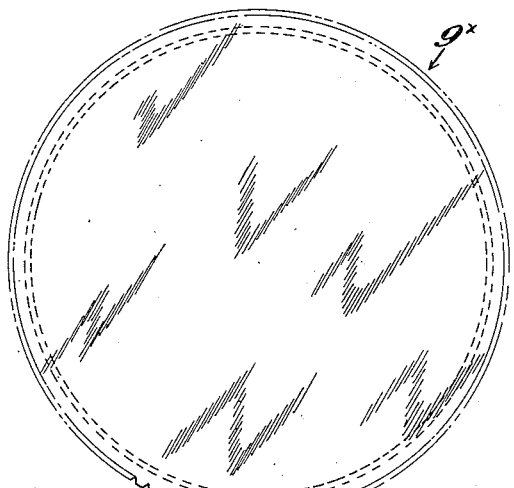
Fig. 3 is a front elevation of a cap of slightly different shape from that shown in Fig. 1.

In Fig. 1, the outer surface of the flange 10 is shown as of polygonal contour having twelve flat surfaces or facets 13, thus providing a pleasing ornamental effect. On the other hand, as illustrated in Figs. 3 and 4, the cap 9ˣ is of circular external contour having the transparent panel portion 12ˣ and the attaching flange 10ˣ, the latter having the series of ribs or corrugations 13ˣ on its outer surface which impart a finished and ornamental appearance.

Figure 4:
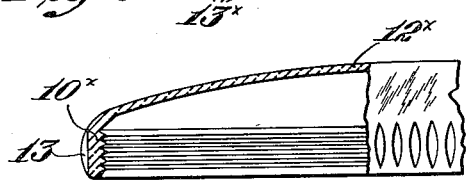
Fig. 4 is a fragmentary side elevation, partly in diametrical section, of the cap of Fig. 3.
Figure 11:
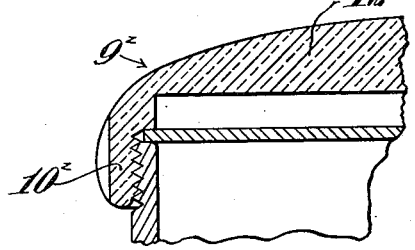
Fig. 11 is a fragmentary diametrical section illustrating a cap of modified construction.

While the concavo-convex form of panel shown in Figs. 2 and 4 is desirable in that it provides a large space S between the interior surface of the cap and the dial, thus making it readily possible to mount the dial against the outer edge of the case, thereby increasing the field of visibility and reducing shadows, it is sometimes preferable to form the cap as shown in Fig. 11, wherein the cap 9ᶻ has the transparent portion 12ᶻ and the internally screw-threaded flange 10ᶻ. In this instance the inner surface of the panel is recessed for the accommodation of the index but said inner surface is substantially flat and perpendicular to the axis of the cap, while the outer surface is convex. Such an arrangement provides considerable magnification for the characters on the dial and may be of value when it is necessary to place the graduation very closely together or when it is desired to make the gauge readable from an unusual distance.

While certain desirable embodiments of the invention have been herein illustrated by way of example, it is to be understood that the invention is not necessarily limited to these precise embodiments but is to be regarded as inclusive of any and all equivalent constructions, materials and arrangements falling within the scope of the appended claims.

I claim:

1. In combination with an instrument of the class described having a case provided with a cylindrical wall open at its front end, a dial of a diameter approximating that of the front of the case, said dial having graduations upon its marginal portion and being disposed substantially in the plane of the forward edge of said wall, and a removable cap for said open end of the case, said cap having an unobstructed transparent concavo-convex panel whose inner surface is of a diameter at least as great as the inside diameter of the case and having the margin of its inner concave surface substantially in the plane of the forward edge of the case, said cap also having an attaching flange engageable with the cylindrical surface of the wall of the case, the panel merging integrally with the attaching flange.

2. In combination with an instrument of the class described having a casing provided with a side wall, a dial of substantially the same diameter as the front of the casing and having graduations upon its marginal portion, said dial being disposed substantially at the front of the casing, and a removable cap covering the front of the casing, said cap having an unobstructed transparent concavo-convex panel whose inner surface is of a diameter at least as great as the diameter of the front of the casing, and having the margin of its inner concave surface substantially in the plane of the front of the casing, said cap also having an attaching flange removably engageable with the side wall of the casing, the panel being homogeneously integral with the attaching flange.

3. An instrument of the class described having a casing, a graduated dial, whose area substantially equals that of the front of the casing, disposed substantially at the front of the casing, index means cooperable with the dial, and means within the casing for actuating the index means, and a removable cap designed to house and protect the index means, characterized in that the cap comprises an attaching flange designed for removable engagement with the casing and a front panel which is molecularly united to the flange, said panel having a convex outer surface and having an inner surface whose marginal portion is disposed substantially in the plane of the front of the casing and which is so contoured as to provide space, forward of the dial, to accommodate the index, said panel having an unobscured transparent area of substantially the same size and contour as the dial and which registers with the dial, thereby providing maximum visibility of the dial so that the extreme margin of the dial is available for graduations.

4. In combination in an instrument of the class described having a casing, a graduated dial whose area substantially equals that of the front of the casing, a movable index in front of the dial, an index-actuating means within the casing behind the dial, the dial being located substantially at the front of the casing, and a removable cap overlying the dial, the cap comprising a concavo-convex panel of non-shattering material having an unobstructed transparent area of substantially the same size and contour as the dial and registering with the latter and having the margin of its inner surface substantially in the front plane of the casing, the cap also including an integral attaching flange engageable with the casing for holding the cap in p'ace.

5. A removable, dial-protecting cap for an instrument of the class described and which includes a casing, a graduated dial of an area approximately equaling the area of the front of the casing, a movable index in front of the dial, and index-actuating means within the casing behind the dial, the dial being disposed in a plane closely adjacent to the front plane of the casing, said cap consisting of a unitary mass of tough, non-shattering material, characterized in that the cap includes an unobscured, transparent, smooth, concavo-convex panel portion, and an attaching element integral with the panel portion and designed removably to secure the cap to the casing, the transparent panel portion of the cap being of a diameter at least as great as that of the dial, the panel and attaching element being so constructed and arranged that when the cap is attached to the casing in normal operative position the margin of the inner surface of the panel is closely adjacent to the plane of the front of the casing, whereby substantially the entire area of the dial is visible and the margin of the dial is available for the reception of graduations.

6. A cap for use with a gauge of the kind having a casing provided with a graduated dial disposed substantially at the front of the casing and of an area approximately equaling the area of the front of the casing, an index in front of the dial and mechanism within the casing for actuating the index, the casing having a side wall provided with screw threads at its forward portion, the cap consisting of a unitary mass of moulded material and including a concavo-convex transparent unobstructed panel portion and a screw-threaded flange integral with said panel portion and designed for screw-threaded engagement with the screw-threaded portion of the casing wall, the transparent panel portion of the cap being of a diameter at least as great as that of the dial and the screw threads on the attaching flange extending throughout substantially the entire depth of the latter whereby, when the cap is screwed tightly onto the casing, the extreme margin of the inner surface of the cap will be disposed substantially in the front plane of the casing.

JOSEPH V. TRACY.